US008877343B2

(12) United States Patent
Kawasaki et al.

(10) Patent No.: US 8,877,343 B2
(45) Date of Patent: *Nov. 4, 2014

(54) LAMINATED POLYESTER FILM

(75) Inventors: Taishi Kawasaki, Shiga-ken (JP);
Masato Fujita, Shiga-ken (JP)

(73) Assignee: Mitsubishi Plastics, Inc., Tokyo (JP)

( * ) Notice: Subject to any disclaimer, the term of this patent is extended or adjusted under 35 U.S.C. 154(b) by 483 days.

This patent is subject to a terminal disclaimer.

(21) Appl. No.: 13/377,178

(22) PCT Filed: May 31, 2010

(86) PCT No.: PCT/JP2010/059193

§ 371 (c)(1),
(2), (4) Date: Jan. 23, 2012

(87) PCT Pub. No.: WO2010/143551

PCT Pub. Date: Dec. 16, 2010

(65) Prior Publication Data

US 2012/0128969 A1 May 24, 2012

(30) Foreign Application Priority Data

Jun. 12, 2009 (JP) .................. 2009-140857
Jun. 12, 2009 (JP) .................. 2009-140861

(51) Int. Cl.
*B32B 27/08* (2006.01)
*B32B 27/18* (2006.01)
*B32B 27/26* (2006.01)
*B32B 27/28* (2006.01)
*B32B 27/30* (2006.01)
*B32B 27/36* (2006.01)
*B32B 27/38* (2006.01)
*C09D 5/00* (2006.01)
*C09D 133/04* (2006.01)
*C09D 133/08* (2006.01)
*C09D 133/10* (2006.01)
*G02B 1/11* (2006.01)
*G02B 1/10* (2006.01)
*C08J 7/04* (2006.01)

(52) U.S. Cl.
CPC . *G02B 1/105* (2013.01); *G02B 1/11* (2013.01); *C08J 7/047* (2013.01); *C08J 2367/02* (2013.01); *B32B 27/08* (2013.01); *B32B 27/36* (2013.01); *B32B 2250/244* (2013.01); *B32B 2255/10* (2013.01); *B32B 2255/26* (2013.01); *B32B 2457/20* (2013.01)
USPC ........... 428/483; 428/332; 428/336; 428/339; 428/413; 428/480; 428/522; 525/165; 525/175; 359/601

(58) Field of Classification Search
None
See application file for complete search history.

(56) References Cited

U.S. PATENT DOCUMENTS

| | | | | | |
|---|---|---|---|---|---|
| 5,466,535 | A | * | 11/1995 | Higgins et al. | 428/483 |
| 5,632,626 | A | * | 5/1997 | Collins et al. | 439/66 |
| 5,932,320 | A | * | 8/1999 | Okajima et al. | 428/195.1 |
| 5,958,659 | A | * | 9/1999 | Takahashi | 430/533 |
| 6,025,031 | A | * | 2/2000 | Lettmann et al. | 427/388.4 |
| 6,096,410 | A | * | 8/2000 | Okajima et al. | 428/195.1 |
| 6,165,602 | A | * | 12/2000 | Fujita | 428/216 |
| 6,348,267 | B1 | * | 2/2002 | Okajima | 428/423.7 |
| 6,403,224 | B1 | * | 6/2002 | Okajima et al. | 428/423.7 |
| 6,589,649 | B2 | * | 7/2003 | Oya et al. | 428/343 |
| 6,610,378 | B1 | * | 8/2003 | Kimura et al. | 428/35.8 |
| 6,926,945 | B2 | * | 8/2005 | Yano et al. | 428/141 |
| 7,005,176 | B2 | * | 2/2006 | Tojo et al. | 428/141 |
| 7,026,035 | B2 | * | 4/2006 | Yano et al. | 428/141 |
| 7,790,356 | B2 | * | 9/2010 | Kishioka et al. | 430/311 |
| 7,972,700 | B2 | * | 7/2011 | Takada et al. | 428/423.1 |
| 8,133,592 | B2 | * | 3/2012 | Takada et al. | 428/482 |
| 2006/0269764 | A1 | * | 11/2006 | Tanaka et al. | 428/458 |
| 2008/0050583 | A1 | * | 2/2008 | Kubo | 428/339 |
| 2008/0138597 | A1 | * | 6/2008 | Asai | 428/220 |
| 2010/0215902 | A1 | * | 8/2010 | Kiehne et al. | 428/141 |
| 2012/0121918 | A1 | * | 5/2012 | Kawasaki et al. | 428/480 |
| 2012/0128969 | A1 | * | 5/2012 | Kawasaki et al. | 428/336 |
| 2012/0128985 | A1 | * | 5/2012 | Kawasaki et al. | 428/413 |
| 2012/0128986 | A1 | * | 5/2012 | Kawasaki et al. | 428/413 |
| 2012/0189831 | A1 | * | 7/2012 | Kawasaki et al. | 428/216 |
| 2012/0189832 | A1 | * | 7/2012 | Kawasaki et al. | 428/216 |
| 2013/0078471 | A1 | * | 3/2013 | Hiraki et al. | 428/413 |
| 2013/0095325 | A1 | * | 4/2013 | Hiraki et al. | 428/413 |
| 2013/0133743 | A1 | * | 5/2013 | Grah | 136/259 |
| 2013/0143033 | A1 | * | 6/2013 | Kawasaki et al. | 428/328 |
| 2013/0337267 | A1 | * | 12/2013 | Funatsu et al. | 428/412 |

FOREIGN PATENT DOCUMENTS

| | | | |
|---|---|---|---|
| JP | 2006-175628 | | 7/2006 |
| JP | 2008-039803 | * | 2/2008 |
| JP | 2008-116710 | | 5/2008 |
| JP | 2008-208223 | * | 9/2008 |
| JP | 2009-126043 | | 6/2009 |
| JP | 2009-143226 | * | 7/2009 |

* cited by examiner

OTHER PUBLICATIONS

Int'l. Search Report for PCT/JP2010/059193, mailed Aug. 31, 2010.

*Primary Examiner* — Vivian Chen
(74) *Attorney, Agent, or Firm* — Nixon & Vanderhye P.C.

(57) ABSTRACT

The present invention provides a laminated polyester film which can be prevented from suffering from occurrence of interference fringes owing to reflection of external light and is excellent in adhesion to various surface functional layers such as a hard coat. The laminated polyester film of the present invention comprises a polyester film and a coating layer formed on at least one surface of the polyester film which is produced by applying a coating solution comprising a compound having a condensed polycyclic aromatic structure and an oxazoline compound or an epoxy compound thereonto, which coating layer has a thickness of 0.04 to 0.15 μm.

12 Claims, No Drawings

LAMINATED POLYESTER FILM

This application is the U.S. national phase of International Application No. PCT/JP2010/059193 filed 31 May 2010 which designated the U.S. and claims priority to JP Application No. 2009-140857 filed 12 Jun. 2009 and JP Application No. 2009-140861 filed 12 Jun. 2009, the entire contents of each of which are hereby incorporated by reference.

TECHNICAL FIELD

The present invention relates to a laminated polyester film, and more particularly, to a laminated polyester film which can be suitably used in the applications in which occurrence of interference fringes owing to reflection of external light should be reduced, including, for example, liquid crystal displays, plasma display panels, organic electroluminescence, etc.

BACKGROUND ART

In recent years, polyester films have been frequently used as various kinds of optical films, e.g., employed in various applications such as an antireflection film, a touch panel, a prism sheet, a light diffusion sheet and an electromagnetic shielding film as a member of liquid crystal displays or plasma displays. A base film used for these members has been required to have excellent transparency and visibility.

These films have been often subjected to hard coating treatment in order to enhance an anti-curling property and a mar resistance thereof, etc. In the hard coating treatment, in order to enhance adhesion between a polyester film as a base material and a hard coat layer, a coating layer having an easy-adhesive property is generally provided as an intermediate layer therebetween. For this reason, refractive indices of these three layers including the polyester film, the easy-adhesive coating layer and the hard coat layer must be taken into consideration to avoid occurrence of interference fringes and deterioration in visibility.

In recent years, form the economical viewpoints, it has been required to take a suitable measure against the interference fringes by providing a high-refractive hard coat layer to simplify a structure of an antireflection layer to be formed thereon, or by providing the high-refractive hard coat layer solely without any antireflection layer. For this reason, the easy-adhesive coating layer is also required to have a high refractive index. In general, it is considered that the refractive index of the coating layer at which occurrence of interference fringes can be reduced is a geometrical mean value of a refractive index of the polyester film as a base material and a refractive index of the hard coat layer. Therefore, it is required to adjust the refractive index of the coating layer near to the geometrical mean value.

As the method of enhancing a refractive index of the coating layer to prevent occurrence of interference fringes, there is known, for example, the method in which a metal oxide having a high refractive index is incorporated in the coating layer. However, in this method, the resulting film tends to be deteriorated in transparency, thereby failing to exhibit a sufficient performance thereof in various optical applications (Patent Document 1). As an alternative method, there has been proposed the method in which a metal chelate compound is used in combination with a resin. However, in this method, owing to unstableness of the metal chelate compound in an aqueous solution, a coating solution used therein also tends to become unstable according to combination between the compound and resin, so that the procedure of replacing the coating solution with new one must be conducted so many times while continuing the film production process for a long period of time (Patent Document 2). In addition, an ordinary high-refractive material tends to be deteriorated in adhesion to a surface functional layer such as the hard coat layer. Therefore, it has been required to provide a coating layer which is capable of effectively exhibiting an enhanced adhesion property to the high refractive material even when used in combination therewith.

PRIOR ARTS

Patent Documents

Patent Document 1: Japanese Patent Application Laid-Open (KOKAI) No. 2004-54161
Patent Document 2: Japanese Patent Application Laid-Open (KOKAI) No. 2005-97571

SUMMARY OF THE INVENTION

Problems to be Solved by the Invention

The present invention has been accomplished to solve the above conventional problems. An object of the present invention is to provide a laminated polyester film which is prevented from suffering from occurrence of interference fringes owing to reflection of external light, and exhibits an excellent adhesion property to various surface functional layers such as a hard coat.

Means for Solving Problems

As a result of the present inventors' earnest study in view of the above problems, it has been found that these problems can be readily solved by using a laminated polyester film having a specific structure. The present invention has been attained on the basis of this finding.

That is, in an aspect of the present invention, there is provided a laminated polyester film comprising a polyester film and a coating layer formed on at least one surface of the polyester film which is produced by applying a coating solution comprising a compound having a condensed polycyclic aromatic structure and an oxazoline compound or an epoxy compound thereonto, which coating layer has a thickness of 0.04 to 0.15 μm.

Effect of the Invention

In accordance with the present invention, there can be provided a laminated polyester film which can be prevented from suffering from occurrence of interference fringes owing to reflection of external light and is excellent in adhesion to various surface functional layers such as a hard coat when the surface functional layers are laminated thereon. Therefore, the present invention has a high industrial value.

PREFERRED EMBODIMENTS FOR CARRYING OUT THE INVENTION

The present invention is described in more detail below.
The polyester film constituting the laminated polyester film of the present invention may have either a single layer structure or a multilayer structure. Unless departing from the scope of the present invention, the polyester film may have not only a two or three layer structure but also a four or more multilayer structure, and the layer structure of the polyester film is not particularly limited thereto.

The polyester used in the present invention may be either a homopolyester or a copolyester. The homopolyester is preferably obtained by polycondensing an aromatic dicarboxylic acid and an aliphatic glycol. Examples of the aromatic dicarboxylic acid include terephthalic acid and 2,6-naphthalenedicarboxylic acid. Examples of the aliphatic glycol include ethylene glycol, diethylene glycol and 1,4-cyclohexanedimethanol. Typical examples of the polyesters include polyethylene terephthalate or the like. On the other hand, as a dicarboxylic acid component of the copolyester, there may be mentioned at least one compound selected from the group consisting of isophthalic acid, phthalic acid, terephthalic acid, 2,6-naphthalenedicarboxylic acid, adipic acid, sebacic acid and oxycarboxylic acids (such as, for example, p-oxybenzoic acid). As a glycol component of the copolyester, there may be mentioned at least one compound selected from the group consisting of ethylene glycol, diethylene glycol, propylene glycol, butanediol, 4-cyclohexanedimethanol and neopentyl glycol.

In addition, the polyester film used in the present invention may also comprise an ultraviolet absorber in order to improve a weather resistance of the film and prevent deterioration of a pigment used in the applications such as a color filter. The ultraviolet absorber is not particularly limited as long as it is a compound having a capability of absorbing an ultraviolet ray and can withstand heat applied during a process for producing the polyester film.

As the ultraviolet absorber, there are generally known an organic ultraviolet absorber and an inorganic ultraviolet absorber. In view of a good transparency, among these ultraviolet absorbers, the organic ultraviolet absorber is preferred. Examples of the organic ultraviolet absorber include, but are not particularly limited to, cyclic iminoester-based ultraviolet absorbers, benzotriazole-based ultraviolet absorbers and benzophenone-based ultraviolet absorbers. Among these organic ultraviolet absorbers, cyclic iminoester-based ultraviolet absorbers and benzotriazole-based ultraviolet absorbers are preferred in view of a good durability. These ultraviolet absorbers may be used in combination of any two or more thereof.

For the purpose of imparting an easy-slipping property to the film and preventing occurrence of flaws in the film during the respective steps, particles are preferably compounded in the polyester layer in the film of the present invention. The kinds of particles to be compounded in the polyester layer are not particularly limited as long as the particles are capable of imparting a good easy-slipping property to the film. Specific examples of the particles include particles of silica, calcium carbonate, magnesium carbonate, barium carbonate, calcium sulfate, calcium phosphate, magnesium phosphate, kaolin, aluminum oxide, titanium oxide, etc. In addition, there may also be used heat-resistant organic particles as described in Japanese Patent Publication (KOKOKU) No. 59-5216, Japanese Patent Application Laid-Open (KOKAI) No. 59-217755 or the like. Examples of the other heat-resistant organic particles include particles of thermosetting urea resins, thermosetting phenol resins, thermosetting epoxy resins, benzoguanamine resins, etc. Further, there may also be used deposited particles obtained by precipitating and finely dispersing a part of metal compounds such as a catalyst during the process for production of the polyester.

On the other hand, the shape of the particles used above is also not particularly limited, and may be any of a spherical shape, a massive shape, a bar shape, a flat shape, etc. Further, the hardness, specific gravity, color and the like of the particles are also not particularly limited. These particles may be used in combination of any two or more kinds thereof, if required.

The average particle diameter of the particles used above is usually in the range of 0.01 to 3 µm and preferably 0.1 to 2 µm. When the average particle diameter of the particles is less than 0.01 µm, the particles may fail to impart a sufficient easy-slipping property to the polyester layer, or tend to be aggregated together and therefore exhibit a poor dispersibility, which will cause deterioration in transparency of the resulting film. On the other hand, when the average particle diameter of the particles is more than 3 µm, the surface roughness of the obtained film tends to be too coarse, so that there tend to arise various problems when forming the various surface functional layers thereon in the subsequent steps.

The content of the particles in the polyester layer is usually in the range of 0.001 to 5% by weight and preferably 0.005 to 3% by weight. When the content of the particles in the polyester layer is less than 0.001% by weight, the resulting film tends to be insufficient in easy-slipping property. On the other hand, when the content of the particles in the polyester layer is more than 5% by weight, the resulting film tends to be insufficient in transparency.

The method of adding the particles to the polyester layer is not particularly limited, and any conventionally known methods can be suitably used therefor. For example, the particles may be added at any optional stages in the process for production of the polyester constituting the respective layers of the film. The particles are preferably added to the polyester after completion of an esterification reaction or a transesterification reaction thereof.

In addition, there may also be used the method of blending a slurry of the particles prepared by dispersing the particles in ethylene glycol or water with the raw polyester material using a vented kneading extruder, the method of blending the dried particles with the raw polyester material using a kneading extruder, or the like.

Meanwhile, the polyester film used in the present invention may also comprise, in addition to the above particles, known additives such as an antioxidant, an antistatic agent, a thermal stabilizer, a lubricant, a dye, a pigment, etc., if required.

The thickness of the polyester film used in the present invention is not particularly limited as long as it lies within any suitable range capable of forming a film shape, and is usually in the range of 10 to 300 µm and preferably 50 to 250 µm.

Next, an example of the process of producing the polyester film used in the present invention is more specifically explained, although not particularly limited thereto. That is, in the production process, there is preferably used such a method in which the above-mentioned raw polyester material is extruded from a die in the form of a molten sheet, and the molten sheet is cooled and solidified on a cooling roll to obtain an unstretched sheet. In this case, in order to enhance a flatness of the sheet, it is preferred to enhance adhesion between the sheet and a rotary cooling drum. For this purpose, an electrostatic adhesion method and/or a liquid coating adhesion method are preferably used. Next, the thus obtained unstretched sheet is biaxially stretched. In such a case, the unstretched sheet is first stretched in one direction thereof using a roll-type or tenter-type stretching machine. The stretching temperature is usually 70 to 120° C. and preferably 80 to 110° C., and the stretch ratio is usually 2.5 to 7 times and preferably 3.0 to 6 times. Next, the thus stretched film is stretched in the direction perpendicular to the stretching direction of the first stage. In this case, the stretching temperature is usually 70 to 170° C., and the stretch ratio is usually 3.0 to 7 times and preferably 3.5 to 6 times. Successively, the resulting biaxially stretched sheet is heat-treated at a temperature of 180 to 270° C. under a tension or relaxation within 30% to obtain a biaxially stretched film. Upon the above stretching steps, there may also be used the method in which the stretching in each direction is carried out in two or more stages. In such a case, the multi-stage stretching is preferably performed such that the stretch ratio in each of the two directions is finally fallen within the above-specified range.

Also, upon producing the polyester film constituting the laminated polyester film according to the present invention, there may also be used a simultaneous biaxial stretching method. The simultaneous biaxial stretching method is such a method in which the above unstretched sheet is stretched and oriented in both of the machine and width directions at the same time while maintaining the sheet in a suitable temperature-controlled condition at a temperature of usually 70 to 120° C. and preferably 80 to 110° C. The stretch ratio used in the simultaneous biaxial stretching method is 4 to 50 times, preferably 7 to 35 times and more preferably 10 to 25 times in terms of an area ratio of the film. Successively, the obtained biaxially stretched sheet is heat-treated at a temperature of 170 to 250° C. under a tension or relaxation within 30% to obtain a stretched oriented film. As the apparatus used in the above simultaneous biaxial stretching method, there may be employed those stretching apparatuses of any conventionally known type such as a screw type stretching apparatus, a pantograph type stretching apparatus and a linear drive type stretching apparatus.

Next, the method of forming the coating layer constituting the laminated polyester film according to the present invention is explained. The coating layer may be formed by either an in-line coating method in which the surface of the polyester film is subjected to coating treatment during the stretching step of the polyester film, an off-line coating method in which the polyester film produced is once transferred to an outside of the film production system and subjected to coating treatment, or combination of these methods. Among these methods, the in-line coating method is preferably used because the coating layer can be produced simultaneously with formation of the polyester film and therefore at low costs, and the thicknesses of the coating layer can be varied by controlling a stretch ratio of the polyester film.

For example, in the case of a sequential biaxial stretching, the in-line coating treatment may be carried out, in particular, after completion of the longitudinal stretching but before initiation of the lateral stretching, although not particularly limited thereto. When the coating layer is formed on the polyester film by the in-line coating method, the coating can be carried out simultaneously with formation of the polyester film, and the coating layer can be treated at a high temperature. As a result, it is possible to produce a film suitable as the polyester film used in the present invention.

In the present invention, it is essentially required that the polyester film is provided, on at least one surface thereof, with the coating layer which is formed by applying a coating solution comprising a compound having a condensed polycyclic aromatic structure and an oxazoline compound and an epoxy compound onto the at least one surface of the polyester film.

Specific examples of the compound having a condensed polycyclic aromatic structure used in the present invention include compounds represented by the following formulae which are naphthalene, anthracene, phenanthrene, naphthacene, benz[a]anthracene, benz[a]phenanthrene, pyrene, benz[c]phenanthrene and perylene, respectively.

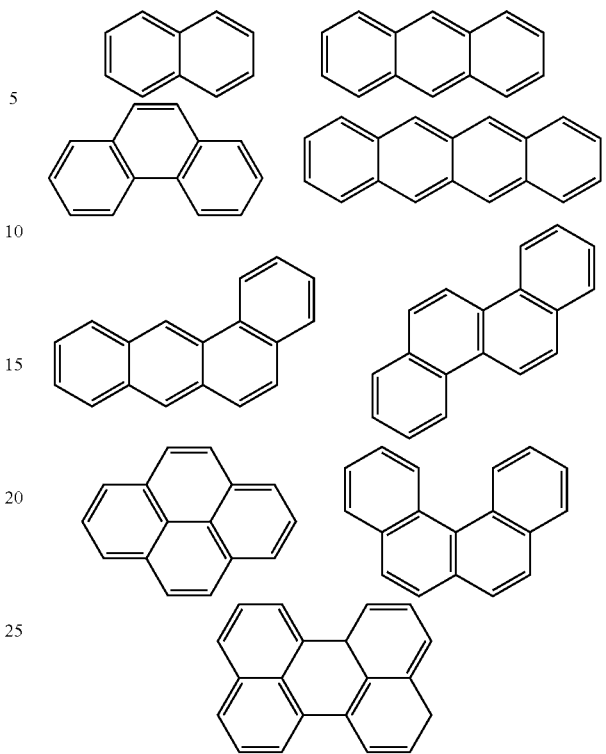

In view of a good coatability on the polyester film, as the compound having a condensed polycyclic aromatic structure, there are preferably used, for example, polymers such as polyester resins, acrylic resins and urethane resins. Among these polymers, especially preferred are polyester resins because they are capable of introducing a large number of the condensed polycyclic aromatic structures thereinto.

As the method of incorporating the condensed polycyclic aromatic structure into the polyester resins, there may be used the method of introducing two or more hydroxyl groups as substituent groups into the condensed polycyclic aromatic structure to provide a diol component or a polyhydric hydroxyl group component, or the method of introducing two or more carboxyl groups as substituent groups into the condensed polycyclic aromatic structure to provide a dicarboxylic acid component or a polycarboxylic acid component.

From the standpoint of less coloration of the film upon the production process of the laminated polyester film, the condensed polycyclic aromatic structure contained in the coating layer is preferably a naphthalene skeleton. In addition, from the viewpoints of good adhesion to a light diffusion layer or an anti-sticking layer to be formed on the coating layer or a good transparency of the resulting film, there are suitably used resins into which the naphthalene skeleton is incorporated as a constituting component of the polyester. Typical examples of the naphthalene skeleton include 1,5-naphthalenedicarboxylic acid, 2,6-naphthalenedicarboxylic acid and 2,7-naphthalenedicarboxylic acid.

Meanwhile, various substituent groups other than the hydroxyl group or carboxyl group, such as a substituent group comprising a sulfur element, an aromatic substituent group such as a phenyl group, and a halogen element group, may be introduced into the condensed polycyclic aromatic structure. In such a case, it can be expected to enhance a refractive index of the resulting film. Further, from the viewpoints of a good coatability and a good adhesion property, a further substituent group such as an alkyl group, an ester group and an amide group may also be introduced into the condensed polycyclic aromatic structure.

The oxazoline compound means a compound comprising an oxazoline group in a molecule thereof, in particular, a polymer comprising an oxazoline group in a molecule thereof. The polymer may be produced by polymerizing an addition-polymerizable monomer solely or polymerizing the addition-polymerizable monomer with other monomers. Examples of the addition-polymerizable monomer include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline. These addition-polymerizable monomers may be used alone or in the form of a mixture of any two or more thereof. Among these addition-polymerizable monomers, 2-isopropenyl-2-oxazoline is preferred because of good industrial availability. The other monomers are not particularly limited as long as they are capable of being copolymerized with the addition-polymerizable monomer. Examples of the other monomers include (meth)acrylic acid esters such as alkyl(meth)acrylates (in which the alkyl group may be methyl, ethyl, n-propyl, isopropyl, n-butyl, isobutyl, t-butyl, 2-ethylhexyl or cyclohexyl); unsaturated carboxylic acids such as acrylic acid, methacrylic acid, itaconic acid, maleic acid, fumaric acid, crotonic acid, styrenesulfonic acid and salts of these acids (such as sodium salts, potassium salts, ammonium salts and tertiary amine salts); unsaturated nitriles such as acrylonitrile and methacrylonitrile; unsaturated amides such as (meth)acrylamide, N-alkyl(meth)acrylamide and N,N-dialkyl(meth)acrylamide (in which the alkyl group may be methyl, ethyl, n-propyl, isopropyl, n-butyl, isobutyl, t-butyl, 2-ethylhexyl or cyclohexyl); vinyl esters such as vinyl acetate and vinyl propionate; vinyl ethers such as methyl vinyl ether and ethyl vinyl ether; α-olefins such as ethylene and propylene; halogen-containing α,β-unsaturated monomers such as vinyl chloride, vinylidene chloride and vinyl fluoride; and α,β-unsaturated aromatic monomers such as styrene and α-methyl styrene. These monomers may be used alone or in combination of any two or more thereof.

In particular, the oxazoline group-containing polymer is preferably a polymer comprising an oxazoline group in a side chain thereof. Such a polymer may be readily produced by polymerizing the addition-polymerizable oxazoline group-containing monomer with the other monomers. As an example of a commercially available product of the oxazoline compound produced using an acrylic monomer as the other monomer, there may be mentioned "EPOCROSS WS-500" produced by Nippon Shokubai Co., Ltd., which is a polymer-type crosslinking agent prepared by adding an oxazoline group as a branched chain to an acrylic resin, etc.

As the epoxy compound, there may be used, for example, a compound comprising an epoxy group in a molecule thereof, and a prepolymer or a cured product of the compound. Examples of the epoxy compound include condensed products of epichlorohydrin with a hydroxyl group of ethylene glycol, polyethylene glycol, glycerol, polyglycerol, bisphenol A or the like, or an amino group. The condensed product may be in the form of a polyepoxy compound, a diepoxy compound, a monoepoxy compound, a glycidyl amine compound, etc. Specific examples of the polyepoxy compound include sorbitol polyglycidyl ether, polyglycerol polyglycidyl ether, pentaerythritol polyglycidyl ether, diglycerol polyglycidyl ether, triglycidyl tris(2-hydroxyethyl) isocyanate, glycerol polyglycidyl ether and trimethylol propane polyglycidyl ether. Specific examples of the diepoxy compound include neopentyl glycol diglycidyl ether, 1,6-hexanediol diglycidyl ether, resorcin diglycidyl ether, ethylene glycol diglycidyl ether, polyethylene glycol diglycidyl ether, propylene glycol diglycidyl ether, polypropylene glycol diglycidyl ether and polytetramethylene glycol diglycidyl ether. Specific examples of the monoepoxy compound include allyl glycidyl ether, 2-ethylhexyl glycidyl ether and phenyl glycidyl ether. Specific examples of the glycidyl amine compounds include N,N,N',N'-tetraglycidyl-m-xylylenediamine and 1,3-bis(N,N-diglycidylamino)cyclohexane.

In particular, among these epoxy compounds, preferred are polyfunctional epoxy compounds, and more preferred are polyfunctional epoxy compound having at least two glycidyl ether structures. As an example of a commercially available product of the polyfunctional epoxy compound, there may be mentioned "DECONAL EX-521" produced by Nagase Chemtex Co., Ltd., as a polyglycerol polyglycidyl ether, etc.

In the laminated polyester film according to the present invention, for the purposes of improving surface properties of the coating layer, reducing occurrence of interference fringes when laminating various surface functional layers such as a hard coat layer on the coating layer, and enhancing a transparency of the resulting film, there may be used various binder polymers.

The "binder polymer" used in the present invention is defined as a high-molecular compound having a number-average molecular weight (Mn) of not less than 1000 as measured by gel permeation chromatography (GPC) according to a flow scheme for evaluation of safety of high-molecular compounds (Council of Chemical Substances; November, 1985), and exhibiting a good film-forming property.

Specific examples of the binder polymer include polyester resins, acrylic resins, urethane resins, polyvinyl resins (such as polyvinyl alcohol, polyvinyl chloride and vinyl chloride-vinyl acetate copolymers), polyalkylene glycols, polyalkylene imines, methyl cellulose, hydroxy cellulose, starches, etc.

Further, in the coating layer, the above components may be used in combination with a crosslinking agent other than the above oxazoline compound and epoxy compound unless the subject matter of the present invention is adversely affected thereby. As the crosslinking agent other than the oxazoline compound and epoxy compound, there may be used various known resins. Examples of the crosslinking agent other than the oxazoline compound and epoxy compound include melamine compounds and isocyanate compounds.

The melamine compounds are compounds having a melamine skeleton therein. Examples of the melamine compounds include alkylolated melamine derivatives, partially or completely etherified compounds obtained by reacting the alkylolated melamine derivative with an alcohol, and a mixture of these compounds. Examples of the alcohol suitably used for the above etherification include methyl alcohol, ethyl alcohol, isopropyl alcohol, n-butanol and isobutanol. The melamine compound may be either a monomer or a di- or higher polymer, or may be in the form of a mixture thereof. In addition, there may also be used those compounds obtained by co-condensing a urea or the like to a part of melamine. Further, a catalyst may also be used to enhance a reactivity of the melamine compound. In particular, among these melamine compounds, preferred are alkylated melamine compounds, and more preferred are completely alkylated melamine compounds. Specific examples of the melamine compounds include hexamethoxymethyl melamine.

Examples of the isocyanate compound include those compounds having an isocyanate group in a molecule thereof. Specific examples of the isocyanate compound include hexamethylene diisocyanate, trimethyl hexamethylene diisocyanate, cyclohexylene diisocyanate, xylylene diisocyanate, isophorone diisocyanate, naphthalene diisocyanate, tolylene diisocyanate, and polymers, blocked products or derivatives of these compounds.

These crosslinking agents may be used alone or in the form of a mixture of any two or more thereof. Further, in view of the application to in-line coating, the crosslinking agent preferably exhibits a water solubility or a water dispersibility.

In addition, for the purpose of improving an anti-sticking property and a slip property of the coating layer, the coating layer may also comprise inert particles. Specific examples of the inert particles used in the coating layer include inorganic particles such as silica, alumina, kaolin, calcium carbonate and titanium oxide, and organic particles.

Further, the coating layer may also comprise various additives such as a defoaming agent, a coatability improver, a thickening agent, an organic lubricant, an antistatic agent, an ultraviolet absorber, an antioxidant, a foaming agent and a dye, if required, unless the subject matter of the present invention is adversely affected thereby.

The compound having a condensed polycyclic aromatic structure which is used in the coating layer constituting the laminated polyester film of the present invention preferably comprises the condensed polycyclic aromatic structure in an amount of 5 to 80% by weight and more preferably 10 to 60% by weight. The content of the compound having a condensed polycyclic aromatic structure in the coating layer is preferably in the range of 50 to 99% by weight, more preferably 60 to 97% by weight and still more preferably 70 to 95% by weight based on a total amount of the coating layer. When the content of the compound having a condensed polycyclic aromatic structure in the coating layer is out of the above-specified range, the resulting film tends to be deteriorated in visibility owing to occurrence of interference fringes which will be generated after forming a surface functional layer such as a hard coat layer on the coating layer. Meanwhile, the proportion of the condensed polycyclic aromatic structure in the compound may be determined, for example, by the following method. That is, the respective components of the coating layer are dissolved and extracted in an adequate solvent or warm water, and then fractionated by chromatography. The thus obtained products are subjected to structural analysis by NMR or IR and further analyzed by a pyrolysis GC-MS (gas chromatography/mass spectrometry).

In the case where the oxazoline compound is used in the laminated polyester film of the present invention, the content of the oxazoline compound in the coating layer constituting the laminated polyester film is preferably in the range of 1 to 50% by weight, more preferably 1 to 30% by weight and still more preferably 3 to 20% by weight. When the content of the oxazoline compound is less than 1% by weight, there tends to arise such a problem that adhesion of the coating layer to the surface functional layer such as a hard coat layer is lowered. When the content of the oxazoline compound is more than 50% by weight, the refractive index of the coating layer tends to be decreased, so that the resulting film tends to be deteriorated in visibility owing to occurrence of interference fringes which will be generated after forming the surface functional layer such as a hard coat layer on the coating layer.

In the case where the epoxy compound is used in the laminated polyester film of the present invention, the content of the epoxy compound in the coating layer constituting the laminated polyester film is preferably in the range of 1 to 80% by weight and more preferably 10 to 60% by weight. When the content of the epoxy compound is out of the above-specified range, there tends to arise such a problem that adhesion of the coating layer to the surface functional layer such as a hard coat layer is lowered, or the coating layer tends to be deteriorated in surface properties.

The polyester film used in the present invention may also be provided, on its surface opposed to the surface on which the above coating layer is formed, with an addition coating layer. For example, when it is intended to provide a micro lens layer, a prism layer, an anti-sticking layer, a light diffusion layer or a functional layer such as a hard coat on a surface of the polyester film which is opposed to the surface on which the above surface functional layer such as a hard coat layer is formed, the provision of such an additional coating layer on the opposite surface of the polyester film is capable of enhancing adhesion to these functional layers. As the components of the additional coating layer formed on the opposite surface of the polyester film, there may be used conventionally known materials. Examples of the materials include a binder polymer such as polyester resins, acrylic resins and urethane resins, a crosslinking agent such as epoxy compounds, oxazoline compounds, melamine compounds and isocyanate compounds, and the like. These materials may be respectively used alone or in combination of any two or more thereof. In addition, the additional coating layer may be a coating layer formed by applying the same coating solution as described above which comprises the compound having a condensed polycyclic aromatic structure and the oxazoline compound or epoxy compound (i.e., the same coating layer may be formed on opposite surfaces of the polyester film).

The analysis of the respective components contained in the coating layer may be conducted, for example, by surface analysis such as TOF-SIMS.

When forming the coating layer by an in-line coating method, the laminated polyester film is preferably produced by the method in which an aqueous solution or a water dispersion of a series of the above-mentioned compounds is prepared as a coating solution having a concentration of about 0.1 to about 50% by weight in terms of a solid content thereof, and the thus prepared coating solution is applied onto the polyester film. The coating solution may also comprise a small amount of an organic solvent for the purpose of improving a dispersibility in water, a film-forming property, etc., unless the subject matter of the present invention is adversely affected thereby. The organic solvent may be used alone, or two or more organic solvents may be appropriately used in the form of a mixture thereof.

In the laminated polyester film according to the present invention, the thickness of the coating layer formed by applying the coating solution comprising the compound having a condensed polycyclic aromatic structure and the oxazoline compound or epoxy compound onto the polyester film is usually in the range of 0.04 to 0.15 μm and preferably 0.07 to 0.15 μm. When the thickness of the coating layer is out of the above-specified range, the resulting film tends to be deteriorated in visibility owing to occurrence of interference fringes which will be generated after forming a surface functional layer on the coating layer. In addition, in recent years, there has been proposed the method of reducing the thickness of the coating layer to the value lower than the above-specified range in order to lessen an influence of a refractive index of the coating layer and thereby decrease occurrence of interference fringes. However, in the case where an active energy ray is irradiated on the hard coat layer, etc., on such a thin coating layer to form a high-density crosslinked structure, the film tends to suffer from large shrinkage upon curing, resulting in such a problem that the film tends to be undesirably curled owing to application of significant stress exerted on a base material of the film. On the contrary, in the present invention, by increasing the thickness of the coating layer to lie within the above-specified range, there can be attained such an advantage that generation of the stress in the film can be prevented, so that curling of the film can be effectively prevented.

In the present invention, as the method of forming the coating layer, there may be used conventionally known coating methods such as a reverse gravure coating method, a direct gravure coating method, a roll coating method, a die coating method, a bar coating method and a curtain coating method.

In the present invention, the drying and curing conditions used upon forming the coating layer on the polyester film are not particularly limited. For example, in the case where the coating layers are formed by an off-line coating method, the coating layers may be subjected to heat treatment usually at a temperature of 80 to 200° C. for 3 to 40 sec and preferably at a temperature of 100 to 180° C. for 3 to 40 sec.

On the other hand, in the case where the coating layer is formed by an in-line coating method, the coating layer may be subjected to heat treatment usually at a temperature of 70 to 280° C. for 3 to 200 sec.

In any of the off-line coating and in-line coating methods, the heat treatment may be used in combination with irradiation with active energy rays such as irradiation with ultraviolet rays, if required. The polyester film constituting the laminated polyester film of the present invention may also be previously subjected to surface treatments such as corona treatment and plasma treatment.

The coating layer used in the present invention is suitably controlled in its refractive index in order to suppress occurrence of interference fringes, more specifically, is designed such that the refractive index of the coating layer is near a geometrical mean value of refractive indices of the polyester film as a base material and the surface functional layer such as a hard coat layer. The refractive index of the coating layer has a close relationship with a reflectance of the coating layer. When preparing a graph by plotting a wavelength on an abscissa axis thereof and a reflectance on an ordinate axis thereof in the range of a thickness of the coating layer as defined in the present invention, it is preferred that one minimum value of the reflectance is observed on a characteristic curve thereof in the wavelength range of 400 to 800 nm. Assuming that the minimum values of reflectance of coating layers having different refractive indices are observed on their characteristic curves at the same wavelength, the minimum value of reflectance of the coating layer having a higher refractive index becomes larger, whereas the minimum value of reflectance of the coating layer having a lower refractive index becomes smaller.

In the present invention, a good reflectance of the coating layer means that one minimum value with respect to an absolute reflectance of the coating layer is present in the wavelength range of 400 to 800 nm, and more preferably the one minimum value with respect to an absolute reflectance thereof is present in the wavelength range of 500 to 700 nm. The reflectance value at the minimum value preferably lies within the range of 4.0 to 6.5% and more preferably 4.5 to 6.2%. When the number of the minimum value present in the wavelength range of 400 to 800 nm is not one, or when the absolute reflectance at the minimum value is out of the above-specified range, interference fringes tend to be caused after forming the surface functional layer such as a hard coat layer thereon, so that the resulting film tends to be deteriorated in visibility.

In general, in the polyester film used in the present invention, the surface functional layer such as a hard coat layer may be provided on the coating layer. The material used in the hard coat layer is not particularly limited. Examples of the material of the hard coat layer include cured products of monofunctional(meth)acrylates, polyfunctional (meth)acrylates and reactive silicon compounds such as tetraethoxysilane. Among these materials, from the viewpoint of satisfying both a high productivity and a good hardness, especially preferred are cured products obtained by polymerizing compositions comprising ultraviolet-curable polyfunctional (meth)acrylates.

The compositions comprising ultraviolet-curable polyfunctional (meth)acrylates are not particularly limited. For example, there may be used a mixture comprising one or more kinds of conventionally known ultraviolet-curable polyfunctional (meth)acrylates, commercially available products as ultraviolet-curable hard coat materials, or these materials which further comprise other components in such a range that the effects of the present invention are not adversely influenced thereby.

The ultraviolet-curable polyfunctional (meth)acrylates are not particularly limited. Examples of the ultraviolet-curable polyfunctional (meth)acrylates include (meth)acrylic derivatives of polyfunctional alcohols such as dipentaerythritol hexa(meth)acrylate, tetramethylol methane tetra(meth)acrylate, tetramethylol methane tri(meth)acrylate, trimethylol propane tri(meth)acrylate, 1,6-hexanediol di(meth)acrylate and 1,6-bis(3-acryloyloxy-2-hydroxypropyloxy)hexane; polyethylene glycol(meth)acrylate; and polyurethane(meth)acrylate.

The other components which may be contained in the compositions comprising the ultraviolet-curable polyfunctional (meth)acrylates are not particularly limited. Examples of the other components include inorganic or organic fine particles, polymerization initiators, polymerization inhibitors, antioxidants, antistatic agents, dispersants, surfactants, light stabilizers and leveling agents. In addition, when drying the film formed by a wet coating method, an optional amount of a solvent may be added thereto, if required.

As the method of forming the hard coat layer using an organic material, there may be adopted general wet coating methods such as a roll coating method and a die coating method. The thus formed hard coat layer may be subjected to curing reaction by heating or by irradiating an active energy ray such as an ultraviolet ray and electron beam thereto.

EXAMPLES

The present invention is described in more detail below by Examples. However, these Examples are only illustrative and not intended to limit the present invention thereto. In addition, the measuring and evaluating methods used in the present invention are as follows.

(1) Measurement of Intrinsic Viscosity of Polyester:

One gram of a polyester from which the other polymer components incompatible with the polyester and pigments were previously removed was accurately weighed, and mixed with and dissolved in 100 mL of a mixed solvent comprising phenol and tetrachloroethane at a weight ratio of 50:50, and a viscosity of the resulting solution was measured at 30° C.

(2) Measurement of Average Particle Diameter ($d_{50}$: μm):

Using a centrifugal precipitation type particle size distribution measuring apparatus "SA-CP3 Model" manufactured by Shimadzu Seisakusho Co., Ltd., the value of a particle size corresponding to a cumulative fraction of 50% (based on the weight) in equivalent spherical distribution of the particles was measured to determine an average particle diameter thereof.

(3) Method of Measuring Thickness of Coating Layer:

The surface of the coating layer was dyed with $RuO_4$ and embedded in an epoxy resin. Thereafter, the resin-embedded coating layer was cut into a piece by an ultrathin sectioning method, and dyed with $RuO_4$ to observe and measure a cut section of the coating layer using TEM ("H-7650" manufactured by Hitachi Ltd.; accelerated voltage: 100 V).

(4) Method of Evaluating Absolute Reflectance from Surface of Coating Layer Formed on Polyester Film:

A black tape ("Vinyl Tape VT-50" produced by Nichiban Co., Ltd.) was previously attached to a back surface of a polyester film which was opposite to its surface to be measured, and the surface of a coating layer formed on the polyester film was subjected to measurement for an absolute reflectance thereof in a wavelength range of 300 to 800 nm using a spectrophotometer (an ultraviolet/visible spectrophotometer "V-570" and an automatic absolute reflectance analyzer "AM-500N" both manufactured by JASCO Corp.) under the conditions including a synchronous mode; an incident angle of 5°; N-polarization; response: Fast; data sampling interval: 1.0 nm; band width: 10 nm; scanning speed: 1000 m/min, to thereby evaluate a wavelength at a minimum value of the reflectance (bottom wavelength) as well as a reflectance thereof.

(5) Method of Evaluating Interference Fringes:

A coating solution prepared by mixing 72 parts by weight of dipentaerythritol hexaacrylate, 18 parts by weight of 2-hydroxy-3-phenoxypropyl acrylate, 10 parts by weight of antimony pentaoxide, 1 part by weight of a photopolymerization initiator ("IRGACURE 184" (tradename) produced by Ciba Speciality Chemicals Corp.) and 200 parts by weight of methyl ethyl ketone was applied on the coating layer formed on the polyester film such that a coating thickness thereof after drying was 5 μm, and cured by irradiating an ultraviolet ray thereto to thereby form a hard coat layer. The resulting film was visually observed under irradiation with a three band fluorescent lamp to determine whether or not any interference fringes were recognized. The observation results were evaluated according to the following ratings:

A: No interference fringes were recognized.
B: Thin and scattered interference fringes were recognized.
C: Thin but linear interference fringes were recognized.
D: Clear interference fringes were recognized.

(6) Method of Evaluating Adhesion Property (1):

In order to evaluate an adhesion property of the coating layer more strictly, studies have been conducted using a material obtained by excluding antimony pentaoxide from the hard coat solution used in the above (5). More specifically, a coating solution prepared by mixing 80 parts by weight of dipentaerythritol hexaacrylate, 20 parts by weight of 2-hydroxy-3-phenoxypropyl acrylate, 5 part by weight of a photopolymerization initiator ("IRGACURE 184" (tradename) produced by Ciba Speciality Chemicals Corp.) and 200 parts by weight of methyl ethyl ketone was applied on the coating layer formed on the polyester film such that a coating thickness thereof after drying was 5 μm, and cured by irradiating an ultraviolet ray thereto to thereby form a hard coat layer. The thus obtained film was allowed to stand under environmental conditions of 60° C. and 90% RH for 50 hr. Thereafter, the resulting hard coat layer was subjected to cross-cutting to form 100 (10×10) cross-cuts thereon. An 18 mm-wide tape ("Cellotape (registered trademark) CT-18" produced by Nichiban Co., Ltd.) was attached onto the thus cross-cut hard coat layer, and then rapidly peeled off therefrom at a peel angle of 180°. Then, the surface of the hard coat layer from which the tape was peeled off was observed to measure an area of the hard coat layer peeled off together with the tape. The evaluation ratings are as follows.

A: Peeled area of the hard coat layer was less than 5%.
B: Peeled area of the hard coat layer was not less than 5% but less than 20%.
C: Peeled area of the hard coat layer was not less than 20%.

(7) Method of Evaluating Adhesion Property (2):

The same procedure as defined in the above (6) was conducted except that the resulting film was allowed to stand under the environmental conditions of 80° C. and 85% RH for 50 hr.

The polyesters used in the respective Examples and Comparative Examples were prepared by the following methods.

<Method for Producing Polyester (A)>

One hundred parts by weight of dimethyl terephthalate and 60 parts by weight of ethylene glycol as starting materials were charged together with 0.09 part by weight of magnesium acetate tetrahydrate as a catalyst into a reaction vessel, and the reaction therebetween was initiated at 150° C. The reaction temperature was gradually raised while distilling off methanol as produced, and allowed to reach 230° C. after 3 hr. After 4 hr, the transesterification reaction was substantially terminated. Into the obtained reaction mixture were added 0.04 part by weight of ethyl acid phosphate and then 0.04 part by weight of antimony trioxide, followed by subjecting the resulting mixture to polycondensation reaction for 4 hr. More specifically, the reaction temperature was gradually raised from 230° C. until reaching 280° C. On the other hand, the reaction pressure was gradually reduced from normal pressure until finally reaching 0.3 mmHg. After initiation of the reaction, the change in agitation power in the reaction vessel was monitored, and the reaction was terminated at the time at which a viscosity of the reaction solution reached the value corresponding to an intrinsic viscosity of 0.63 on the basis of the change in agitation power in the reaction vessel. The resulting polymer was discharged from the reaction vessel under application of a nitrogen pressure thereto, thereby obtaining a polyester (A) having an intrinsic viscosity of 0.63.

<Method for Producing Polyester (B)>

The same procedure as defined in the above method for producing the polyester (A) was conducted except that after adding 0.04 part of ethyl acid phosphate, 0.2 part of silica particles having an average particle diameter of 1.6 μm in the form of a dispersion in ethylene glycol and 0.04 part of antimony trioxide were added, and the reaction was terminated at the time at which a viscosity of the reaction solution reached the value corresponding to an intrinsic viscosity of 0.65, thereby obtaining a polyester (B) having an intrinsic viscosity of 0.65.

The examples of the compounds constituting the coating layer are as follows.

(Examples of Compounds)

Compound Having a Condensed Polycyclic Aromatic Structure: (I)

Water dispersion of polyester resin obtained by polymerizing the following composition:

Monomer composition: (acid component) 2,6-naphthalenedicarboxylic acid/5-sodium sulfoisophthalic acid//(diol component) ethylene glycol/diethylene glycol=92/8//80/20 (mol %)

Oxazoline Compound: (IIA)

Oxazoline group-containing acrylic polymer "EPOCROSS WS-300" (produced by Nippon Shokubai Co., Ltd.)

Oxazoline Compound: (IIB)

Oxazoline group and polyalkyleneoxide chain-containing acrylic polymer "EPOCROSS WS-500" (produced by Nippon Shokubai Co., Ltd.; polymer of a type comprising 1-methoxy-2-propanol as a solvent in an amount of about 38% by weight)

Oxazoline Compound: (IIC)
Oxazoline group and polyalkyleneoxide chain-containing acrylic polymer "EPOCROSS WS-700" (produced by Nippon Shokubai Co., Ltd.; polymer of a VOC-free type)
Epoxy Compound: (IID)
Polyglycerol polyglycidyl ether "DECONAL EX-521" (produced by Nagase Chemtex Co., Ltd)
Epoxy Compound: (IIE)
Epoxy resin "DECONAL EX-1410" (produced by Nagase Chemtex Co., Ltd)
Epoxy Compound: (IIF)
Epoxy resin "DECONAL EX-1610" (produced by Nagase Chemtex Co., Ltd)
Urethane Resin: (III)
Carboxylic acid water-dispersed type polyester polyurethane resin "HYDRAN AP-40" (produced by DIC Corp.)
Hexamethoxymethyl Melamine: (IV)
Particles: (V) Silica Sol Having an Average Particle Diameter of 65 nm Example 1

A mixed raw material obtained by mixing the polyesters (A) and (B) in amounts of 90% and 10%, respectively, as a raw material for outermost layers (surface layers), and the polyester (A) as a raw material for an intermediate layer, were respectively charged into two extruders, melted therein at 285° C., and then co-extruded therefrom on a cooling roll whose surface was controlled to a temperature of 40° C. to form a sheet having a two-kind/three-layer structure (discharge amount: surface layer/intermediate layer/surface layer=1:18:1), followed by cooling and solidifying the thus co-extruded sheet on the cooling roll, thereby obtaining an unstretched sheet. Next, the thus obtained unstretched sheet was stretched utilizing a difference between peripheral speeds of rolls at a temperature of 85° C. and a stretch ratio of 3.4 times in a longitudinal direction thereof. Thereafter, a coating solution 1 shown in the below-mentioned Table 1 was applied on both surfaces of the thus obtained longitudinally stretched sheet. Then, the resulting coated sheet was introduced into a tenter where the sheet was stretched at a temperature of 120° C. and a stretch ratio of 3.8 times in a lateral direction thereof and then heat-treated at 225° C. Next, the obtained stretched sheet was relaxed by 2% in a lateral direction thereof, thereby obtaining a polyester film having a thickness of 100 μm which was provided on both surfaces thereof with the coating layer having a thickness (after dried) of 0.11 μm.

As a result of measuring an absolute reflectance of the thus obtained polyester film, it was confirmed that the minimum value of the absolute reflectance was observed at 640 nm, and the reflectance at the minimum value was 5.0%. In addition, it was confirmed that no interference fringes were observed even after forming the hard coat layer on the film, and adhesion between the respective layers in the film was good. The properties of the obtained polyester film are shown in Table 3.

Examples 2 to 26

The same procedure as defined in Example 1 was conducted except that the coating agent composition was changed to those shown in Table 1 or Table 2, thereby obtaining polyester films. As shown in Table 3 and Table 4, the thus obtained polyester films exhibited a high reflectance and a good level concerning occurrence of interference fringes and had a good adhesion property.

Comparative Examples 1 to 3

The same procedure as defined in Example 1 was conducted except that the coating agent composition was changed to those shown in Table 1 or Table 2, thereby obtaining polyester films. The evaluation results of the thus obtained laminated polyester films are as shown in Table 3 or Table 4, namely, it was confirmed that the films suffered from occurrence of clear interference fringes, or had a poor adhesion property.

TABLE 1

| Coating solutions | Coating agent composition (wt %) | | | | | | | |
|---|---|---|---|---|---|---|---|---|
| | I | IIA | IIB | IIC | III | IID | IV | V |
| Coating solution 1 | 95 | 5 | 0 | 0 | 0 | 0 | 0 | 3 |
| Coating solution 2 | 87 | 10 | 0 | 0 | 0 | 0 | 0 | 3 |
| Coating solution 3 | 96 | 0 | 1 | 0 | 0 | 0 | 0 | 3 |
| Coating solution 4 | 94 | 0 | 3 | 0 | 0 | 0 | 0 | 3 |
| Coating solution 5 | 92 | 0 | 5 | 0 | 0 | 0 | 0 | 3 |
| Coating solution 6 | 87 | 0 | 10 | 0 | 0 | 0 | 0 | 3 |
| Coating solution 7 | 77 | 0 | 20 | 0 | 0 | 0 | 0 | 3 |
| Coating solution 8 | 67 | 0 | 30 | 0 | 0 | 0 | 0 | 3 |
| Coating solution 9 | 77 | 0 | 10 | 0 | 10 | 0 | 0 | 3 |
| Coating solution 10 | 77 | 0 | 10 | 0 | 0 | 10 | 0 | 3 |
| Coating solution 11 | 77 | 0 | 10 | 0 | 0 | 0 | 10 | 3 |
| Coating solution 12 | 92 | 0 | 0 | 5 | 0 | 0 | 0 | 3 |
| Coating solution 13 | 87 | 0 | 0 | 10 | 0 | 0 | 0 | 3 |
| Coating solution 14 | 97 | 0 | 0 | 0 | 0 | 0 | 0 | 3 |
| Coating solution 15 | 0 | 0 | 97 | 0 | 0 | 0 | 0 | 3 |

TABLE 2

| Coating solutions | Coating agent composition (wt %) | | | | | | |
|---|---|---|---|---|---|---|---|
| | I | IID | IIE | IIF | III | IV | V |
| Coating solution 16 | 87 | 10 | 0 | 0 | 0 | 0 | 3 |
| Coating solution 17 | 77 | 20 | 0 | 0 | 0 | 0 | 3 |
| Coating solution 18 | 67 | 30 | 0 | 0 | 0 | 0 | 3 |
| Coating solution 19 | 47 | 50 | 0 | 0 | 0 | 0 | 3 |
| Coating solution 20 | 77 | 0 | 20 | 0 | 0 | 0 | 3 |
| Coating solution 21 | 77 | 0 | 0 | 20 | 0 | 0 | 3 |
| Coating solution 22 | 67 | 20 | 0 | 0 | 0 | 10 | 3 |
| Coating solution 23 | 62 | 15 | 0 | 0 | 20 | 0 | 3 |
| Coating solution 24 | 47 | 20 | 0 | 0 | 30 | 0 | 3 |
| Coating solution 25 | 0 | 20 | 0 | 0 | 77 | 0 | 3 |

TABLE 3

| Examples and Comparative Examples | Coating solution | Thickness (μm) | Bottom wavelength (nm) |
|---|---|---|---|
| Example 1 | 1 | 0.11 | 640 |
| Example 2 | 2 | 0.11 | 630 |
| Example 3 | 3 | 0.11 | 650 |
| Example 4 | 4 | 0.11 | 650 |
| Example 5 | 5 | 0.11 | 640 |
| Example 6 | 6 | 0.09 | 530 |
| Example 7 | 6 | 0.11 | 630 |
| Example 8 | 6 | 0.13 | 690 |
| Example 9 | 7 | 0.11 | 630 |
| Example 10 | 8 | 0.11 | 630 |
| Example 11 | 9 | 0.11 | 640 |
| Example 12 | 10 | 0.11 | 600 |
| Example 13 | 11 | 0.11 | 600 |
| Example 14 | 12 | 0.11 | 650 |
| Example 15 | 13 | 0.11 | 630 |
| Comparative Example 1 | 14 | 0.11 | 650 |
| Comparative Example 2 | 15 | 0.10 | 560 |

| Examples and Comparative Examples | Minimum value of absolute reflectance (%) | Interference fringes | Adhesion property (1) |
|---|---|---|---|
| Example 1 | 5.0 | A | A |
| Example 2 | 4.9 | A | A |
| Example 3 | 5.1 | A | A |
| Example 4 | 5.1 | A | A |
| Example 5 | 5.0 | A | A |
| Example 6 | 4.9 | A | A |
| Example 7 | 4.9 | A | A |
| Example 8 | 4.8 | A | A |
| Example 9 | 4.5 | A | A |
| Example 10 | 4.2 | B | A |
| Example 11 | 4.6 | A | A |
| Example 12 | 4.9 | A | A |
| Example 13 | 4.9 | A | A |
| Example 14 | 5.0 | A | A |
| Example 15 | 4.9 | A | A |
| Comparative Example 1 | 5.1 | A | C |
| Comparative Example 2 | 3.0 | D | A |

TABLE 4

| Examples and Comparative Example | Coating solution | Thickness (μm) | Bottom wavelength (nm) |
|---|---|---|---|
| Example 16 | 16 | 0.10 | 610 |
| Example 17 | 17 | 0.08 | 530 |
| Example 18 | 17 | 0.10 | 610 |
| Example 19 | 17 | 0.13 | 690 |
| Example 20 | 18 | 0.10 | 600 |
| Example 21 | 19 | 0.09 | 550 |
| Example 22 | 20 | 0.10 | 600 |
| Example 23 | 21 | 0.10 | 600 |
| Example 24 | 22 | 0.10 | 590 |
| Example 25 | 23 | 0.10 | 610 |
| Example 26 | 24 | 0.10 | 600 |
| Comparative Example 3 | 25 | 0.10 | 590 |

| Examples and Comparative Example | Minimum value of absolute reflectance (%) | Interference fringes | Adhesion property (2) |
|---|---|---|---|
| Example 16 | 5.1 | A | A |
| Example 17 | 5.2 | A | A |
| Example 18 | 5.2 | A | A |
| Example 19 | 5.1 | A | A |
| Example 20 | 5.3 | A | A |
| Example 21 | 5.4 | A | A |
| Example 22 | 5.2 | A | A |
| Example 23 | 5.1 | A | A |
| Example 24 | 5.2 | A | A |
| Example 25 | 4.5 | A | A |
| Example 26 | 4.3 | B | A |
| Comparative Example 3 | 3.9 | D | A |

INDUSTRIAL APPLICABILITY

The film of the present invention can be suitably used, for example, in the applications of various optical films as members of liquid crystal displays or plasma displays in which a good adhesion property to a hard coat layer, etc., and a good visibility are required.

The invention claimed is:

1. A laminated polyester film comprising a polyester film and a coating layer formed on at least one surface of the polyester film which is produced by applying a coating solution comprising a compound having a condensed polycyclic aromatic structure and an oxazoline compound or an epoxy compound thereonto, drying and curing thereof, which coating layer has a thickness of 0.04 to 0.15 μm, wherein an absolute reflectance as measured on a surface of the coating layer has one minimum value in a wavelength range of 400 to 800 nm, and the absolute reflectance at the minimum value is 4.0% to 6.5%.

2. A laminated polyester film according to claim 1, wherein the absolute reflectance as measured on a surface of the coating layer has one minimum value in a wavelength range of 400 to 800 nm, and the absolute reflectance at the minimum value is 4.5% to 6.5%.

3. A laminated polyester film according to claim 1, wherein the compound having a condensed polycyclic aromatic structure comprises the condensed polycyclic aromatic structure in an amount of 5 to 80% by weight.

4. A laminated polyester film according to claim 1, wherein a content of the compound having a condensed polycyclic aromatic structure in the coating layer is 67 to 99% by weight based on a whole amount of the coating layer.

5. A laminated polyester film according to claim 1, wherein the compound having a condensed polycyclic aromatic structure is a polymer compound having a condensed polycyclic aromatic structure.

6. A laminated polyester film according to claim 5, wherein the polymer is a resin into which a naphthalene skeleton as a polyester constituting component is incorporated.

7. A laminated polyester film according to claim 1, wherein a content of the oxazoline compound in the coating layer is 1 to 50% by weight based on a whole amount of the coating layer.

8. A laminated polyester film according to claim 1, wherein the oxazoline compound is a polymer comprising an oxazoline group in a molecule thereof.

9. A laminated polyester film according to claim 8, wherein the oxazoline group-containing polymer is produced by polymerizing an addition-polymerizable oxazoline group-containing monomer with other monomer.

10. A laminated polyester film according to claim 1, wherein a content of the epoxy compound in the coating layer is 1 to 80% by weight based on a whole amount of the coating layer.

11. A laminated polyester film according to claim 1, wherein the epoxy compound is a polyepoxy compound.

12. A laminated polyester film according to claim 11, wherein the polyepoxy compound is a polyglycerol polyglycidyl ether.

\* \* \* \* \*